(12) United States Patent
Ooba et al.

(10) Patent No.: US 9,201,194 B2
(45) Date of Patent: Dec. 1, 2015

(54) OPTICAL MODULE

(71) Applicants: NTT ELECTRONICS CORPORATION, Yokohama-shi, Kanagawa (JP); NIPPON TELEGRAPH AND TELEPHONE CORPORATION, Tokyo (JP)

(72) Inventors: Naoki Ooba, Yokohama (JP); Hiroshi Tomita, Yokohama (JP); Kenji Kobayashi, Yokohama (JP); Yuko Kawajiri, Atsugi (JP); Kenya Suzuki, Atsugi (JP)

(73) Assignees: NTT Electronics Corporation, Yokohama-shi, Kanagawa (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/149,386

(22) Filed: Jan. 7, 2014

(65) Prior Publication Data

US 2014/0193114 A1    Jul. 10, 2014

(30) Foreign Application Priority Data

Jan. 10, 2013    (JP) .................................. 2013-002991

(51) Int. Cl.
*G02B 6/12* (2006.01)
*G02B 6/42* (2006.01)
(Continued)

(52) U.S. Cl.
CPC .............. *G02B 6/12* (2013.01); *G02B 6/12004* (2013.01); *G02B 6/122* (2013.01); *G02B 6/30* (2013.01); *G02B 6/428* (2013.01)

(58) Field of Classification Search
CPC ...... G02B 6/12; G02B 6/12004; G02B 6/122; G02B 6/30; G02B 6/428
USPC .......................................................... 385/14
See application file for complete search history.

(56) References Cited

U.S. PATENT DOCUMENTS 6,567,590 B1    5/2003   Okada
6,970,628 B2    11/2005  Boudreau
(Continued)

FOREIGN PATENT DOCUMENTS

CN          1453599      11/2003
CN        201252099       6/2009
(Continued)

OTHER PUBLICATIONS

Seno, et, al, "Spatial beam transformer for wavelength selective switch consisting of silica-based planar lightwave circuit," OFC/NFOEC Technical Digest, Optical Society of America, 2012, 3 pages.
(Continued)

*Primary Examiner* — Ryan Lepisto
*Assistant Examiner* — Mary A El Shammaa
(74) *Attorney, Agent, or Firm* — Workman Nydegger

(57) ABSTRACT

Provided is an optical module capable of inhibiting both the displacement of an optical axis caused by thermal changes and property degradation in an optical functional circuit. The optical module includes: a planar lightwave circuit including a waveguide-type optical functional circuit and a waveguide region where only an optical waveguide is formed in contact with a side, wherein an emission end face where output light is emitted from the optical functional circuit, or an entrance end face where input light is entered to the optical functional circuit is formed in contact with the side; a fixing mount employed to hold the planar lightwave circuit only in the portion where the waveguide area is located; and an auxiliary mount employed to hold the planar lightwave circuit in contact with a side that is opposite the side where the emission end face or the entrance end face.

12 Claims, 10 Drawing Sheets

(51) Int. Cl.
*G02B 6/122* (2006.01)
*G02B 6/30* (2006.01)

(56) References Cited

U.S. PATENT DOCUMENTS

| | | | |
|---|---|---|---|
| 8,750,659 B2* | 6/2014 | Ban | 385/33 |
| 2010/0322569 A1 | 12/2010 | Ohyama | |
| 2012/0128300 A1* | 5/2012 | Ban | 385/33 |
| 2012/0219251 A1* | 8/2012 | Kuroda et al. | 385/14 |
| 2012/0328236 A1 | 12/2012 | Nasu et al. | |

FOREIGN PATENT DOCUMENTS

| | | |
|---|---|---|
| JP | 10-160960 | 6/1998 |
| JP | H11-183740 | 7/1999 |
| JP | 2001-074972 | 3/2001 |
| JP | 2001-272572 | 10/2001 |
| JP | 2003-222733 | 8/2003 |
| JP | 2006-243391 | 9/2006 |
| JP | 2008-216463 | 9/2008 |
| JP | 2009-175364 | 8/2009 |
| JP | 2009-265188 | 11/2009 |
| JP | 4960294 | 6/2012 |
| JP | 5390562 | 1/2014 |
| WO | 2009/001958 | 12/2008 |
| WO | 2010/082524 | 7/2010 |

OTHER PUBLICATIONS

Office Action in corresponding Chinese Application No. 201410011481.6 dated Apr. 3, 2015.
Office Action in corresponding Japanese Application No. 2013-002991 dated Apr. 21, 2015.
U.S. Appl. No. 13/528,476, Mar. 14, 2014, Office Action.
U.S. Appl. No. 13/528,476, Dec. 26, 2014, Final Office Action.
U.S. Appl. No. 13/528,476, Apr. 14, 2015, Notice of Allowance.
Notice of Allowance dated Oct. 8, 2013 in corresponding Japanese Application No. 2011-138924.
Office Action in corresponding Chinese Patent Application No. 201210211244.8 dated Feb. 24, 2012.
Office Action dated Apr. 30, 2013 from corresponding Japanese Application No. 2011-138924.

* cited by examiner

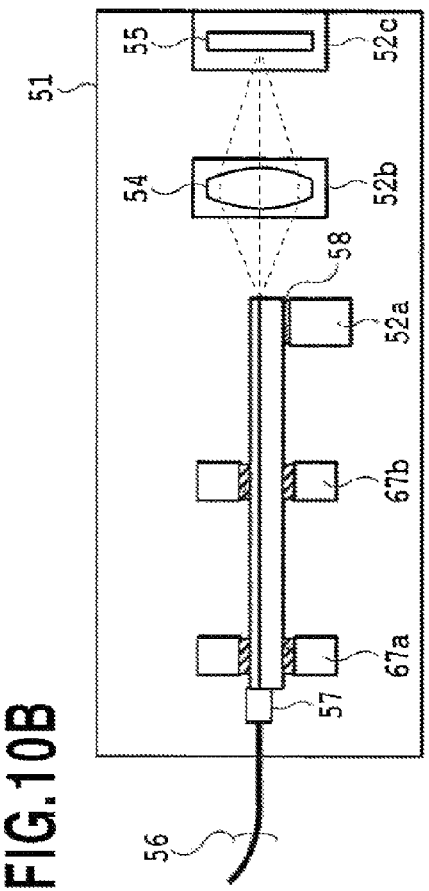
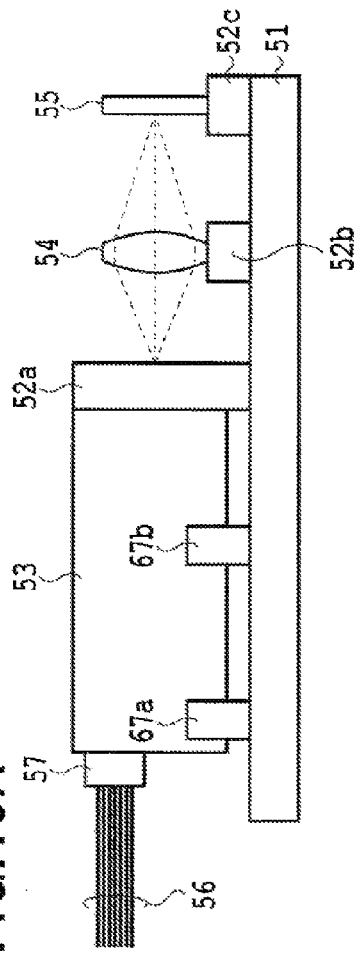
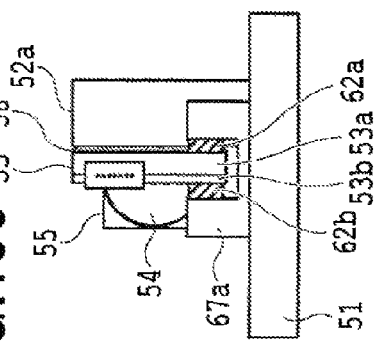
FIG.10A
FIG.10B
FIG.10C

OPTICAL MODULE

CROSS-REFERENCE TO RELATED APPLICATIONS

This application claims the benefit of Japanese Patent Application No. 2013-002991, filed Jan. 10, 2013, which is hereby incorporated by reference herein in its entirety.

BACKGROUND OF THE INVENTION

1. Field of the Invention

The present invention relates to an optical module provided by integrating a planar lightwave circuit with a light-emitting element, a light-receiving element or an optical functional element.

2. Description of the Related Art

The development of optical components has become increasingly important with advances in the optical communication technology. Above all, an optical transceiver has been contemplated to increase transmission speed and response speed, thereby increasing its communication capacity. A commonly used transceiver includes a light-emitting element or a light-receiving element, formed by using an optical semiconductor, and an optical fiber for input or output, where these components are optically coupled through a lens. In an optical receiver, for example, light emitted from an optical fiber at the input side is collected to the light-receiving element through the lens, and is detected by direct detection (intensity detection).

As for a modulation/demodulation processing technique in an optical transmission system, signal transmission using a phase modulation scheme has been widely practiced. A phase shift keying (PSK) scheme is a scheme for transmitting signals by modulating the optical phase, and with this scheme, the transmission capacity has been increased exponentially by performing multilevel modulation.

In order to receive such PSK signals, detection of optical phase is required. A light-receiving element is capable of detecting the intensity of signal light, but is incapable of detecting the optical phase, and thus a method for converting the optical phase to the optical intensity is required. It is noted that a method for detecting a phase difference by employing optical interference. With this method, the signal light is interfered with another light (reference light), and the optical intensity of the interfering light is detected by a light-receiving element to obtain optical phase information. The detection method employed may be coherent detection using a light source separately provided as reference light, or differential detection for splitting signal light and employing a split portion of the light to foe interfered as reference light with the signal light. As described above, unlike the conventional optical receiver employing only an intensity modulation scheme, a recent PSK optical receiver requires an optical interferometer that converts phase information to intensity information by employing optical interference.

Such an optical interferometer can be implemented by using a planar lightwave circuit (PLC). The planar lightwave circuit has superior features in terms of mass productivity, low cost and high reliability, and various types of optical interferometers can be implemented. An optical delay line interferometer or a 90-degree hybrid circuit, for example, is provided as the optical interferometer used in the PSK optical receiver for practical use. Such a planar lightwave circuit can be formed by a standard photolithography method, an etching technique, and glass deposition techniques such as flame hydrolysis deposition (FHD).

In view of a specific forming process, first, an underclad layer formed mainly of silica glass and a core layer having a refractive index higher than that of a clad layer are deposited on a substrate, such as an Si substrate. Then, various waveguide patterns are formed on the core layer, and at the end, she waveguide formed of the core layer is embedded in an overclad layer. Through such a process, a waveguide-type optical functional circuit is obtained. The signal light is confined in the waveguide that is produced via the above process, and is propagated inside the planar lightwave circuit.

FIG. 1 illustrates a method for optically connecting a conventional planar lightwave circuit to an optical receiver. In view of the method for optically connecting a planar lightwave circuit to an optical receiver in a PSK optical receiver, the basic connection between the two is a simple fiber connection, as illustrated in FIG. 1. Here, a planar lightwave circuit 1 where optical fibers 3a and 3b are connected respectively to the input and output ends is connected by optical fibers to an optical receiver 2 that includes an input optical fiber 3b, so that optical coupling between the two is established. The number of optical fibers used for optical coupling can be determined by the number of output lights emitted from the planar lightwave circuit, and may be more than one. However, there has been a problem that when such optical fiber connection is employed, the size of the optical module is increased. To avoid this problem, the output of the planar lightwave circuit and the input of the optical receiver are optically coupled directly by using a lens to provide the whole structure as an integrated package, and as a result, the reduction of the size is enabled. The optical module wherein a planar lightwave circuit and an optical receiver are optically coupled directly is called an integrated optical receiver.

A method for fixing the planar lightwave circuit becomes critical to implement the integrated optical receiver. In a case where the light emitted by the planar lightwave circuit is to be propagated in space and to be coupled to the light-receiving element by using a lens or the like, when the positions of the light emission end, the lens and the light-receiving element are changed relative to each other, all the light may not be received by the light-receiving element, and loss of light may occur. Since the positions of those are particularly varied due to thermal expansions when the temperature of the package storing the optical receiver, the ambient temperature, or the temperature of the individual demerits, etc. changes, the above problem becomes more pronounced. Therefore, in order to perform optical coupling with low loss, the positions of these elements should not be varied at least relative to each other even when the ambient temperature, etc. is changed.

In particular, change in the shape of the planar lightwave circuit, which is caused by thermal expansion due to a change in the ambient temperature, is substantially greater that of the light-receiving element. Further, the area of the optical module that the planar lightwave circuit occupies is about one or two digits larger than the area occupied by the light-receiving element, and the shape change in the planar lightwave circuit due ho thermal expansion is also one or two digits greater than that in the light-receiving element. Furthermore, since there as a great difference in the thermal expansion coefficients between the substrate of the planar lightwave circuit and the deposited thin glass, significant warping occurs due to thermal changes. Accordingly, displacement for light emission from the planar lightwave circuit and a change in the emission angle with respect to the light-receiving element are more important. These two changes affect changes in the positions and angles of light emitted from the planar lightwave circuit, and cause displacement of an optical axis. The displacement of the optical axis degrades the performance or optical coupling relative to the light-receiving element, and causes losses in the optical coupling. For the implementation of the integrated optical receiver, it is critical that such displacement of the optical axis be resolved, or be free from adverse effect.

FIG. 2 illustrates the internal structure of a conventional integrated optical module. A method for rigidly fixing almost the entire bottom surface of the planar lightwave circuit is known to prevent the occurrence of aforementioned displacement of an optical axis due to the thermal changes. In the integrated optical receiver illustrated in FIG. 2, a planar lightwave circuit 13 that includes an optical interferometer as an optical functional circuit, a lens 14 and a light-receiving element 15 are fixed to a base substrate 11 by employing, respectively, fixing mounts 12a, 12b, and 12c that serve as supporting members. An optical fiber 16 and the planar lightwave circuit 13 are connected through an optical fiber fixing component 17. Light that has entered along the optical fiber 16 is interfered in the planar lightwave circuit 13, and is thereafter coupled to the light-receiving element 15 by the lens 14.

The fixing mount 12a and the planar lightwave circuit 13 are fixed by an adhesive 18 or a bonding material, such as solder. Almost the entire bottom surface of the planar lightwave circuit 13 is rigidly fixed to the fixing mount to suppress the thermal expansion and warping changes. Further, since the lens 14 and the light-receiving element 15 are also fixed to the fixing mounts, displacement of an optical axis due no thermal changes is prevented.

The structure of FIG. 2 allows to substantially inhibit the displacement of an optical axis due to thermal changes, while change in the property of she planar lightwave circuit due to thermal changes becomes prominent. As mentioned previously, since the planar lightwave circuit 13 is formed of an Si substrate 13a and a silica glass layer 13b having a great difference in the thermal expansion coefficients therebetween, the change of warping and thermal expansion due to thermal changes become significant. In the structure illustrated in FIG. 2, the entire bottom surface of the planar lightwave circuit 13 is fixed, and therefore, thermal expansion and warping changes are limited.

Meanwhile, in such a structure, high thermal stress is generated between the Si substrate 13a and the silica glass layer 13b. The stress causes a refractive index change inside the silica glass layer 13b through the photo elastic effect. For the optical interferometer formed in the planar lightwave circuit 13, the length of the waveguide and the refractive index are precisely adjusted to control the interference property. The refractive index change caused by the stress changes the equivalent circuit length and also the property of the interferometer, thereby causing degradation in the property of the optical interferometer.

In this regard, when an elastic adhesive, a soft adhesive such as paste, or fixing paste is used as the adhesive 18 in order to suppress the occurrence of thermal stresses for limiting changes in the optical property (see, for example, Patent Literature 1), the affect of the aforementioned displacement of an optical axis may become noticeable, and a loss may occur.

Furthermore, a wavelength selective switch is known as an optical module provided by integrating a planar light wave circuit with an optical functional element (see, for example, Patent Literature 2). A planar lightwave circuit employed for a wavelength selective switch is an optical circuit wherein an arrayed waveguide optical input/output circuit that includes an input/output waveguide, a slab waveguide and an arrayed waveguide is formed. The size (the length of the long side) of the optical circuit in FIG. 2 that includes an optical interferometer is about 10 mm to 20 mm, while the size (the length of the long side) of the optical circuit that includes an arrayed waveguide optical input/output circuit is large, about 30 mm to 200 mm (see, for example, Non-Patent Literature 1).

The increase in size of the planar lightwave circuit causes the increase in the change of a warp due to thermal changes and the increase in the change of the distance of extension due to thermal expansion. As another problem, reliability against vibrations end shocks, particularly, to a drop of a resonance frequency, is reduced, and the stress applied to the planar lightwave circuit by optical fiber fixing parts is increased, so that the change of the above described optical properties would be increased.

CITATION LIST

Patent Literature

PTL 1: Japanese Patent Laid-open No. 2009-175364
PTL 2: Japanese Patent No. 4960294

Non-Patent Literature

NPL 1: Kazunori Seno, et al., "Spatial beam transformer for wavelength selective switch consisting of silica-based planar lightwave circuit", OFC/NFOEC Technical Digest, Optical Society of America, 2012

SUMMARY OF THE INVENTION

An object of the present invention is to provide an optical module capable of inhibiting both the displacement of an optical axis caused by thermal changes and property degradation in an optical functional circuit.

To achieve the above object, one embodiment of the present invention is characterized by comprising: a planar lightwave circuit including a waveguide-type optical functional circuit that is formed on a substrate, and a waveguide region where only an optical waveguide is formed in contact with a side, wherein an emission end face of the optical waveguide where output light is emitted from the optical functional circuit, or an entrance end face of the optical waveguide where input light is entered to the optical functional circuit is formed in contact with the side; a fixing mount employed to hold the planar lightwave circuit only in the portion where the waveguide area is located; and an auxiliary mount employed to hold the planar lightwave circuit in contact with a side that is opposite the side in contact with the emission end face or the entrance end face, wherein the planar lightwave circuit and the auxiliary mount are fixed by employing an elastic adhesive or an elastic structure that has lower elasticity than that of an adhesive or a bonding material that rigidly fixes the planar lightwave circuit to the fixing mount.

As described above, according to the present invention, since the planar lightwave circuit is fixed by employing only the waveguide region where only the optical waveguide is formed, the position of the emission end face or the entrance end face of the waveguide region can be fixed, without being affected by warping change of the planar lightwave circuit due to the thermal change, or by the horizontal positional change due to thermal expansion. Further, since the region for the optical interferometer of the planar lightwave circuit is not fixed, the properties can be stabilized.

Further features of the present invention will become apparent from the following description of exemplary embodiments (with reference to the attached drawings).

BRIEF DESCRIPTION OF THE DRAWINGS

FIG. 10A is a diagram illustrating the internal structure of an optical module according to Embodiment 6 of the present invention;

FIG. 10B is a diagram illustrating the internal structure of the optical module according to Embodiment 6 of the present invention; and FIG. 10C is a diagram illustrating the internal structure of the optical module according to Embodiment 6 of the present invention.

DESCRIPTION OF THE EMBODIMENTS

Embodiments of the present invention will now be described in detail with reference to the accompanying drawings.

In the embodiments, the waveguide region for input/output of light within an optical circuit prepared on a planar lightwave circuit, that should be especially rigidly fixed to prevent displacement of an optical axis, is only fixed to a fixing mount. The region where an optical functional circuit, such as an optical interferometer that is susceptible to stress, is formed is not fixed to the fixing mount. This allows to minimize the effect of stresses at the optical functional circuit even when distortion or warping has occurred due to thermal changes, and therefore, the degradation of the property of the optical functional circuit can be inhibited. Further, since the waveguide region is fixed to the fixing mount, the displacement of an optical axis caused by thermal changes can be inhibited, and an operating margin for an optical module with respect to thermal changes can be increased.

Furthermore, the planar lightwave circuit is fixed to an auxiliary mount by employing the region opposite to the region that is fixed to the fixing mount. At this time, when an elastic adhesive is employed for fixing, not only variations of expansion or warping caused by the temperature can be absorbed, but also vibrations generated by the planar lightwave circuit can be reduced, and further, the force applied by optical fiber fixing components can be absorbed.

Embodiment 1

Figure 1:
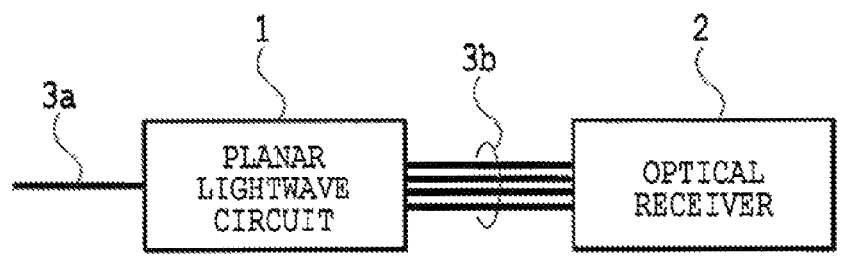
FIG. 1 is a diagram illustrating a method for optically connecting a conventional planar lightwave circuit to an optical receiver.
Figure 2:
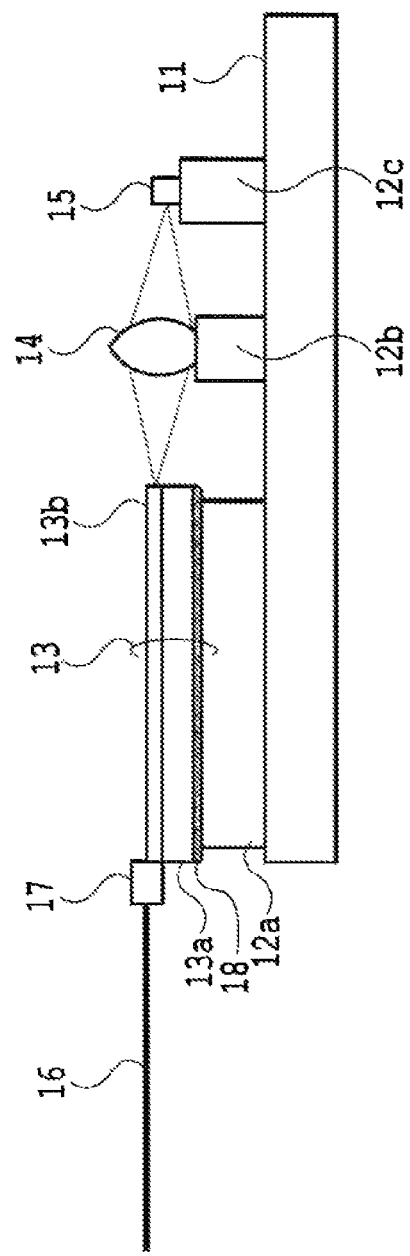
FIG. 2 is a diagram illustrating the internal structure of a conventional optical module.
Figure 3:
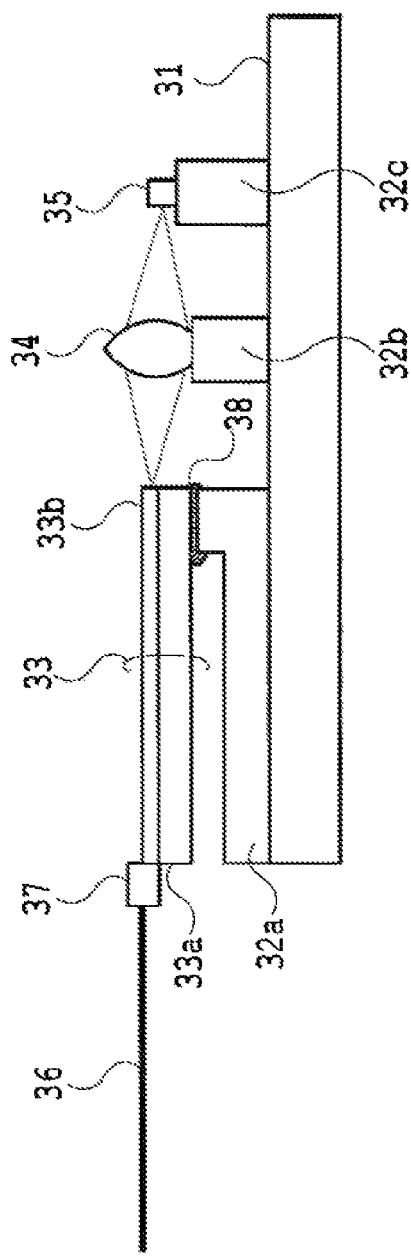
FIG. 3 as a diagram illustrating the internal structure of an optical module according to Embodiment 1 of the present invention.

FIG. 3 illustrates the internal structure of an optical module in accordance with Embodiment 1 of the present invention. A planar lightwave circuit 33 where an optical interferometer is formed as an optical functional circuit, a lens 34 and a light-receiving element 35 are respectively fixed to a base substrate 31 by fixing mounts 32a, 32b, and 32c that serve as supporting members. An optical fiber 38 is connected to the planar lightwave circuit 33 through an optical fiber fixing component 37. In an integrated optical receiver, when light has entered from the optical fiber 36, the optical signal processing, such as interference, is performed for the light by the planar lightwave circuit 33, and thereafter, the obtained light is coupled to the light-receiving element 35 through the lens 34. The planar lightwave circuit 33 is provided by laminating, on an Si substrate 33a, a silica glass layer 33b where a waveguide-type optical functional circuit formed of a core layer and a clad layer is provided.

Figure 4A:
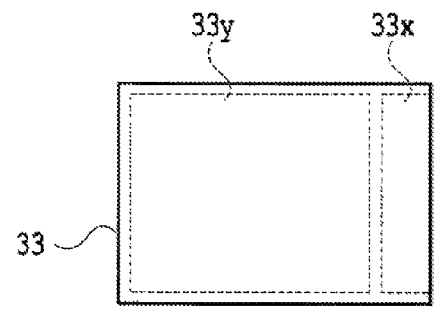
FIG. 4A is a diagram illustrating a method for fixing the planar lightwave circuit in accordance with Embodiment 1.
Figure 4B:
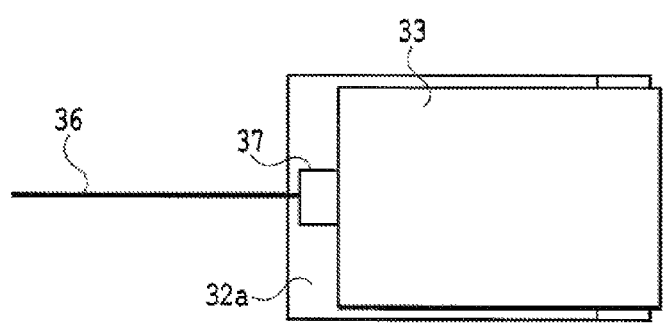
FIG. 4B is a diagram illustrating the method for fixing the planar lightwave circuit in accordance with Embodiment 1.
Figure 4C:
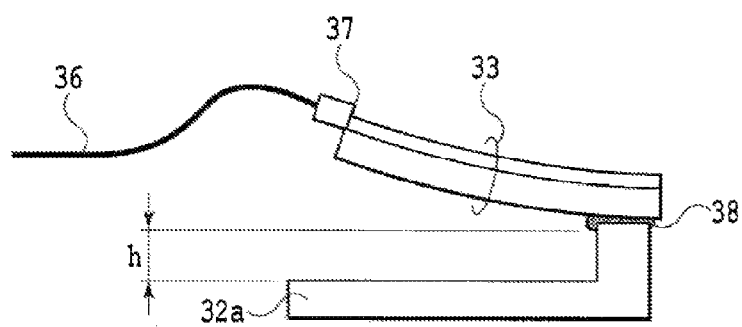
FIG. 4C is a diagram illustrating the method for fixing she planar lightwave circuit in accordance with Embodiment 1.
Figure 4D:
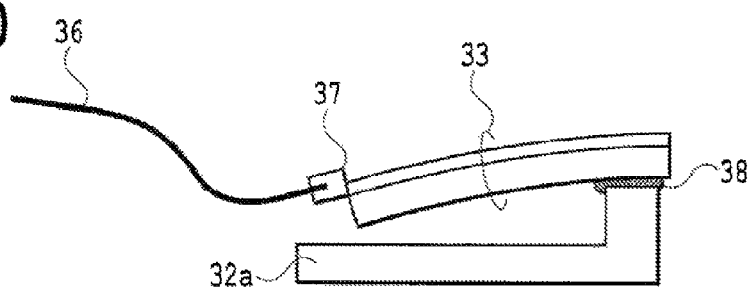
FIG. 4D is a diagram illustrating a method for fixing the planar lightwave circuit in accordance with Embodiment 1.

FIGS. 4A to 4D illustrate a method for fixing the planar lightwave circuit in accordance with Embodiment 1. The method for fixing the planar lightwave circuit 33 illustrated in FIG. 3 will now be described in detail. As shown in FIG. 4A, the silica glass layer 33b of the planar lightwave circuit 33 includes a region 33y where an optical interferometer is formed as an optical functional circuit, and a waveguide region 33x where only an optical waveguide is formed (an optical interferometer is not formed) is contact with one side. An emission end face of the optical waveguide where output light is emitted to the lens 34 is formed in contact with the one side. The fixing mount 32a has an inverted L-shape or a hook shape in a side view as illustrated in FIG. 3, and the waveguide region 33x within the optical circuit prepared on the planar lightwave circuit 33 is only fixed by employing an adhesive 38 or a bonding material, such as solder (see FIG. 4B).

The region 33y of the optical interferometer of the planar lightwave circuit 33 is not fixed to the fixing mount 32a, and is held above the fixing mount 32a. The shape of the planar lightwave circuit 33 can be changed, as desired, regardless of the occurrence of warping due to thermal changes (see FIGS. 4C and 4D), and is insusceptible to stresses. This allows to secure the position of the emission end of the waveguide region 33x, without being affected by any warping changes of the planar lightwave circuit 33 due to thermal changes and without any positional changes in a horizontal direction (with respect to the circuit plane of the planar lightwave circuit 33) due to thermal expansion. Since the lens 34 and the light-receiving element 35 are also fixed to the fixing mount, displacement of an optical axis due to thermal changes does not occur.

The stress or stress changes caused by implementation induces birefringence changes in the optical waveguide. Since the optical interferometer is sensitive to the birefringence changes and is susceptible to property degradation, the property can be stabilized by not fixing the region 33y of the optical interferometer to the fixing mount 32a. The waveguide region 33x, on the other hand, is fixed to the fixing mount 32a, however, the property degradation due to the birefringence changes can be reduced, because the planar lightwave circuit 33 has a small effect of stresses due to warping changes, compared to a case wherein the entire surface of the planar lightwave circuit is fixed to the fixing mount.

A difference in height relative to the fixed part should be provided for the part of the fixing mount 32a where the planar lightwave circuit 33 is not fixed (unfixed part), so that the planar lightwave circuit 33 and the upper surface of the unfixed part do not contact each other even when warping change of the planar lightwave circuit 33 is caused due to thermal changes. Otherwise, if the planar lightwave circuit 33 is in contact with the fixing mount 32a as a result of a warping change, stress to the substrate will be generated, and this will lead to property degradation. In a case wherein the planar lightwave circuit 33 is formed of an Si substrate and a silica-based glass material, a height difference h of approximately several hundred μm should be provided between the unfixed part and the fixed part (see FIG. 4C).

The description has been given for a case wherein the planar lightwave circuit 33 is formed of an Si substrate and a silica-based glass material, however, the planar lightwave circuit 33 may be entirely formed of a semiconductor material or a glass-based material, or may be formed of a dielectric material, such as LiNbO$_3$. In either case, the effect of stresses caused by implementation of the planar lightwave circuit and by thermal changes can be suppressed.

Figure 5A:
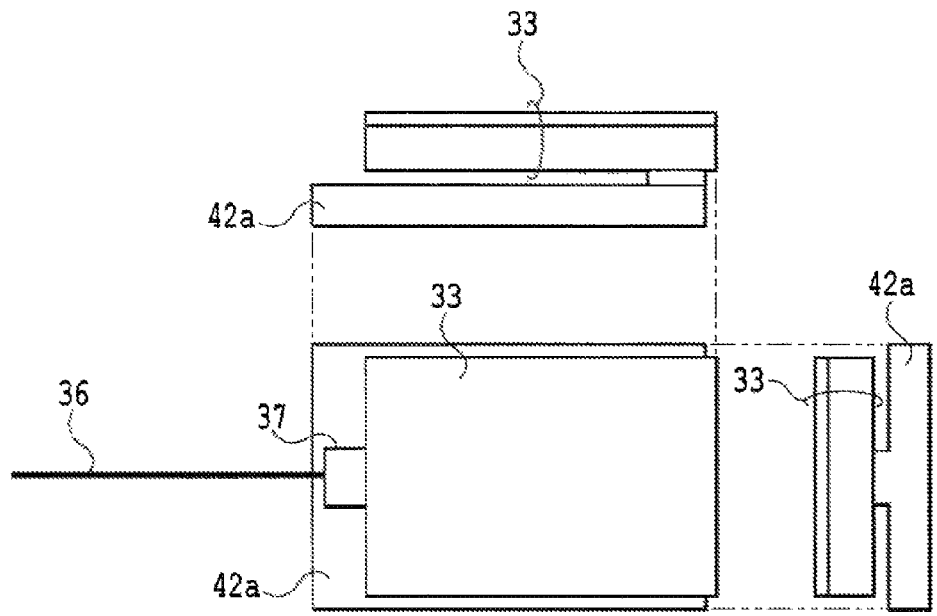
FIG. 5A is a diagram illustrating the method for fixing the planar lightwave circuit in accordance with Embodiment 1.
Figure 5B:
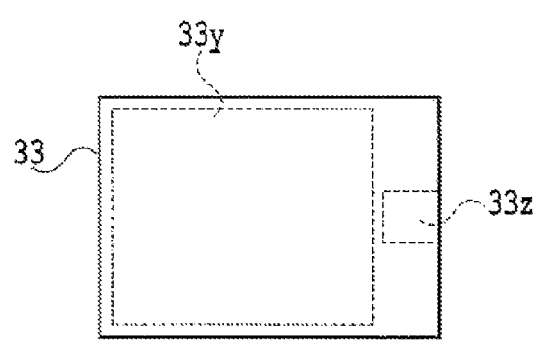
FIG. 5B is a diagram illustrating a method for fixing the planar lightwave circuit in accordance with Embodiment 1.

The planar lightwave circuit and the fixed part of the fixing mount can foe further limited to prevent degradation of properties upon thermal changes or at the time of implementation. Specifically, as illustrated in FIG. 5A, a fixing mount 42a with a fixed part having a limited shape is employed, instead of the fixing mount 32a illustrated in FIG. 4. As illustrated in FIG. 5B, the waveguide region 33z in the planar lightwave circuit 33 is limited to a portion along the side of the emission end face in consonance with the shape of the fixed part of the fixing mount 42a, so that the positron of the emission end of the waveguide region 33z can be fixed without any positional changes in horizontal direction doe to thermal expansion. Compared with the structure shown in FIG. 4, this allows to further reduce stresses generated by implementation and stress changes caused by thermal changes.

So long as the planar lightwave circuit and the fixed part of the mounting mount are located near the light emission end, except for the region 33y, the same effects can be obtained. Therefore, the area for the fixed part is not limited to the lower face of the Si substrate 33a of the planar lightwave circuit 33, and may be the upper face of the silica glass layer 33b or the end face of the emission end face.

Embodiment 2

Figure 6:
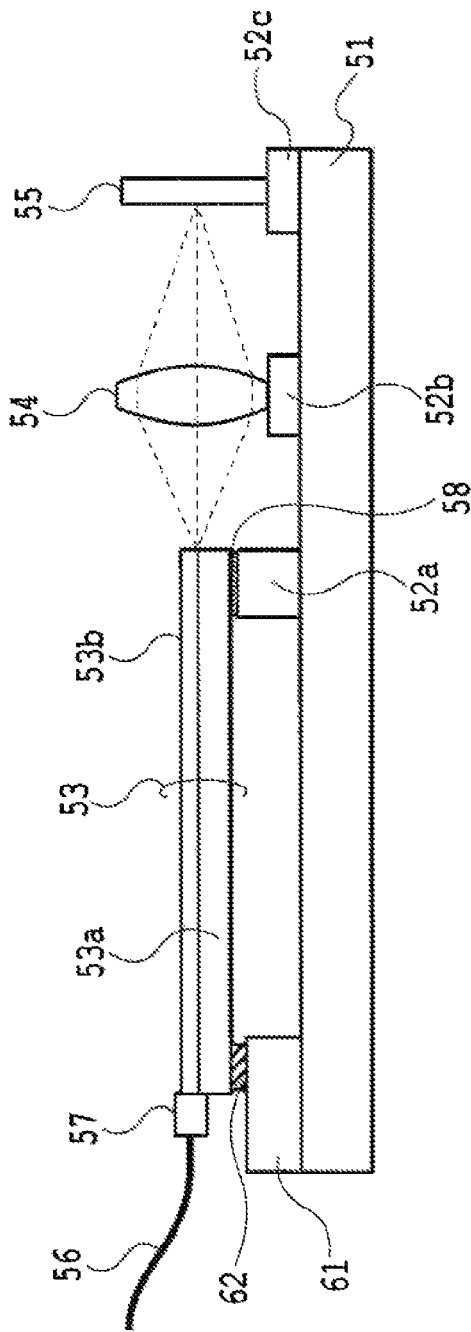
FIG. 6 is a diagram illustrating the internal structure of an optical module according to Embodiment 2 of the present invention.

FIG. 6 illustrates the internal structure of an optical module in accordance with Embodiment 2 of the present invention. A planar lightwave circuit 53 where an arrayed waveguide optical input/output circuit is formed as an optical functional circuit, a lens 54 and an optical functional element 55 are respectively fixed to a case substrate 31 by fixing mounts 52a, 52b, and 52c that serve as supporting members. An optical fiber 56 is connected to the planar lightwave circuit 53 through an optical fiber fixing component 57. In a wavelength selective switch, when light has entered from the optical fiber 56, the optical signal processing, such as optical combining/splitting or optical shaping to adjust the diameter of a beam, is performed for the light by the planar lightwave circuit 53, and thereafter, the obtained light is coupled to the optical functional element 15 through the lens 54. The planar lightwave circuit 53 is provided by laminating, on an Si substrate 53a, a silica glass layer 53b where a waveguide-type optical functional circuit formed of a core layer and a clad layer is provided.

A method for fixing the planar lightwave circuit 53 will now be described. As well as in Embodiment 1, the waveguide region within the optical circuit prepared on the planar lightwave circuit 53 is only fixed to the fixing mount 52a by employing an adhesive 58. As shown in FIG. 4, the fixing mount 52a may be fixed along one side where the emission end face of the optical waveguide is formed for propagating light to be emitted to the lens 54, or as shown in FIG. 5, a limited shape may be employed for the fixed part. A commonly adhesive, such as acrylic adhesive or epoxy-based adhesive, may be employed as the adhesive 58, and the elasticity after the adhesive has cured, of about 10 MPa or more is appropriate. The planar lightwave circuit is rigidly fixed by employing this adhesive 58 to prevent the optical coupling of the planar lightwave circuit 53 to the lens 54 and the optical functional element 55 from the affect due to the thermal changes. Further, when rigid fixing is available, the living process may be performed not only by employing the adhesive, but also by employing a bonding agent, such as solder, or by welding. So long as the planar lightwave circuit 53 can be rigidly fixed by fixing mount 52a, and in a case wherein, as shown in FIG. 5, the shape of the fixed part is limited, the fixing mount 52a of a 3 to 10 mm square is employed for a substrate of 400×100 mm.

Meanwhile, an auxiliary mount 61 is provided for the base substrate 51 to support the planar lightwave circuit 53 in contact with the side opposite the side along which the emission and face of the planar lightwave circuit is formed. Here, the planar lightwave circuit 53 and the auxiliary mount 61 are fixed together by employing an elastic adhesive 62. The elastic adhesive 62 has the elasticity after the adhesive has cured, of about 0.1 MPa or smaller, which is lower than that of the adhesive 58. An example well known adhesive of this type is a modified silicone-based adhesive. Further, the thickness of the adhesive 58 layer is 5 to 20 μm, while the thickness of the elastic adhesive 62 layer is about 100 μm to 1 mm for absorbing the expansion and warping change due to the temperature.

Further, when instead of the elastic adhesive, an elastic structure, such as a spring that has about the same elastic modulus, is employed for fixing, the same effects can be obtained.

The long side of the planar lightwave circuit 53 where the arrayed waveguide optical input/output circuit is formed is long, about 30 mm to 200 mm, and therefore, if only the fixing mount is employed for fixing the planar lightwave circuit 53 in the same manner as in Embodiment 1, the resonant frequency of the planar lightwave circuit 53 would foe reduced (2 kHz or lower), and the reliability relative to the vibrations will be deteriorated. Further, in a case wherein the optical fiber 56 connected via the optical fiber fixing part 57 is a fiber array having a plurality of cores, the force applied to the planar lightwave circuit 53 by these members would be increased. In some cases, while taking the strength into account, it is difficult that these members are supported at the location apart from the fixing mount 52, i.e., along the side opposite the side where the emission end face is formed.

In Embodiment 2, since the planar lightwave circuit 53 is fixed to the auxiliary mount 61, by using the elastic adhesive 62, along the side opposite the side where the emission end face is formed, the vibrations of the planar lightwave circuit 53 can be reduced, and the force applied by the optical fiber fixing part 57 can be absorbed. Even in a case wherein there is a difference in the thermal expansion coefficients between the planar lightwave circuit 53 and the base substrate 51, a difference of the distance of extension due to thermal expansion can be absorbed by using the elastic adhesive 62. Therefore, the auxiliary mount 61 is required for absorption of vibrations and stress, and one or two fixing mounts 52a of about 5 mm square are employed for a substrate of 40×100 mm, for example.

Embodiment 3

Figure 7:
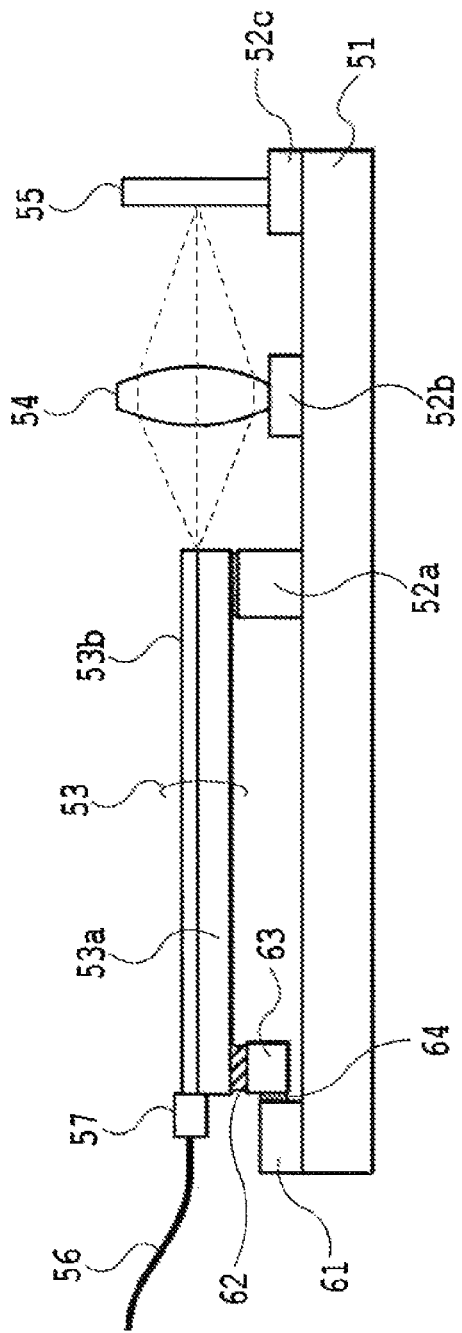
FIG. 7 is a diagram illustrating the internal structure of an optical module according to Embodiment 3 of the present invention.

FIG. 7 illustrates the internal structure of an optical module in accordance with. Embodiment 3 of the present invention. A planar lightwave circuit 53 where an optical combining/splitting circuit is formed as an optical functional circuit, a lens 54 and an optical functional element 55 are respectively fixed so a bass substrate 51 by fixing mounts 52a, 52b, and 52c that serve as supporting members. An optical fiber 56 is connected to the planar lightwave circuit 53 through an optical fiber fixing component 57. As well as in Embodiment 2, the waveguide region within the optical circuit prepared on the planar lightwave circuit 53 is only fixed to the fixing mount 52a by employing an adhesive 58. Meanwhile, the planar lightwave circuit 53 and an auxiliary mount 61 are connected together via an intermediate auxiliary mount 63.

For the procedures for fixing the planar lightwave circuit 53, first, the planar lightwave circuit 53 is fixed to the fixing mount 52a to establish an optical connection between the planar lightwave circuit 53 and the optical system. Then, the planar lightwave circuit 53 is connected to the auxiliary mount 61. However, for the structure shown in Embodiment 2, when an elastic adhesive 62 is applied between the planar lightwave circuit 53 and the auxiliary mount 61, there is a possibility that the adhesive 62 might shrink while curing, and apply stress to the planar lightwave circuit 53. Further, there is also a possibility that the elastic adhesive may stretch by shrinkage during curing, and fail in the state that there is no flexibility left to absorb vibration or stress.

Therefore, in Embodiment 3, the planar lightwave circuit 53 is fixed to the intermediate auxiliary mount 63 by employing the elastic adhesive 62, and thereafter, is fixed to the fixing mount 52a to establish an optical connection between the planar lightwave circuit 53 and the optical system. Next, the intermediate auxiliary mount 63 is fixed to the auxiliary mount 61 by using an adhesive 64. As a result, applying of unnecessary stress to the planar lightwave circuit 33 by the elastic adhesive 62 is prevented.

The method for fixing the intermediate auxiliary mount 63 to the auxiliary mount 61 is not limited to the use of an adhesive, and a method, such as fastening by screws or welding, may also be employed to obtain the effects to prevent the application of unnecessary force.

Embodiment 4

Figure 8:
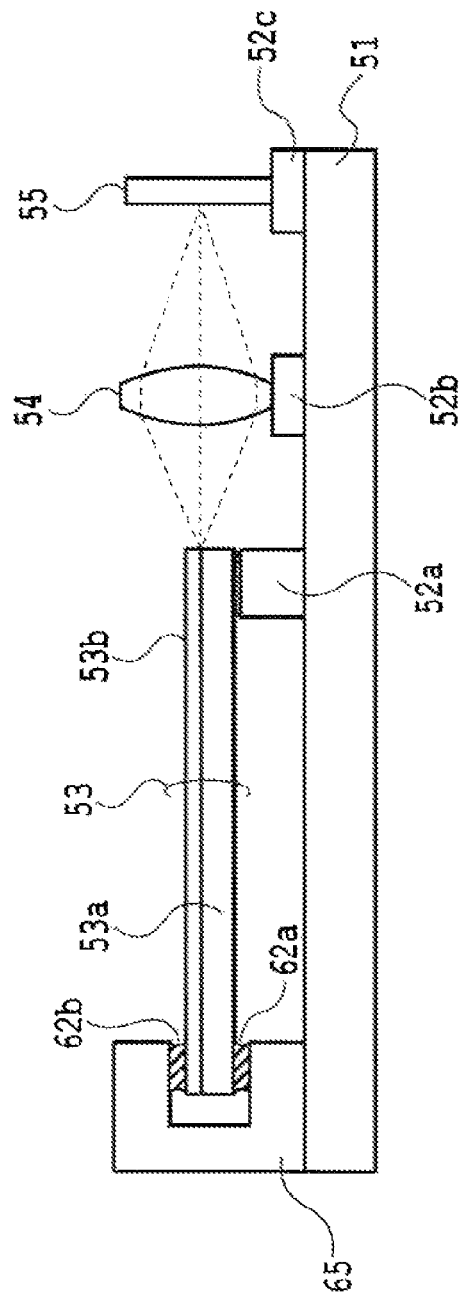
FIG. 8 is a diagram illustrating the internal structure of an optical module according to Embodiment 4 of the present invention.

FIG. 8 illustrates the internal structure of an optical module in accordance with Embodiment 4 of the present invention. A planar lightwave circuit 53 where an optical combining/splitting circuit is formed as an optical functional circuit, a lens 54 and an optical functional element 55 are respectively fixed to a base substrate 51 by fixing mounts 52a, 52b, and 52c that serve as supporting members. A connection to an optical fiber is not shown for simplifying the drawing. As well as in Embodiment 2, the waveguide region within the optical circuit prepared on the planar lightwave circuit 53 is only fixed to the fixing mount 52a by employing an adhesive 58. Meanwhile, an auxiliary mount 65 has a C-shape in a side view as shown in FIG. 8, and the planar lightwave circuit 53 is fixed to the auxiliary mount 65 by using two portions, i.e., the face of an Si substrate 53a and the face of a silica glass layer 53b.

In Embodiments 2 and 3, there is a possibility that, when the elastic adhesive 62 is thermally expanded or shrunk due to the change of the ambient temperature where the optical module is employed, a stress may be applied to the planar lightwave circuit 53. Therefore, in Embodiment 4, when the planar lightwave circuit 53 is to be fixed to the auxiliary mount 65, the same amounts of elastic adhesives 62a and 62b are applied substantially to the face of the Si substrate 53a and the face of the silica glass layer 53b, respectively, and are cured at the same time. As a result, almost the same stress is applied to the face of the Si substrate 53a and to the face of the silica glass layer 53b, and the stresses to be exerted to the planar lightwave circuit 53 are offset each other. Further, since the elastic adhesives 62a and 62b are cured at the same time, the stresses due to the shrinkage of the elastic adhesives during curing can also be offset, as described in Embodiment 3.

It should be noted that a gap between the planar lightwave circuit 53 and the auxiliary mount 65 is about 100 μm to 1 mm, as described above. Furthermore, the portion on the plane where the auxiliary mount 65 in the C-shape and the planar lightwave circuit 53 overlap each other, i.e., the area where the elastic adhesive 62a or 62b is applied is a size of a 5 mm square. Therefore, when the surface tension is employed for applying the elastic adhesive that is not yet cured, almost the same amount of adhesive can be applied. In principle, even when the thicknesses of the elastic adhesive 62a layer and the thickness of the elastic adhesive 62b layer differ from each other, this does not affect the balance of upward and downward stresses, and therefore, there is an advantage that high mechanical accuracy is not required for incorporating thy planar lightwave circuit 53 in the optical module.

Embodiment 5

Figure 9:
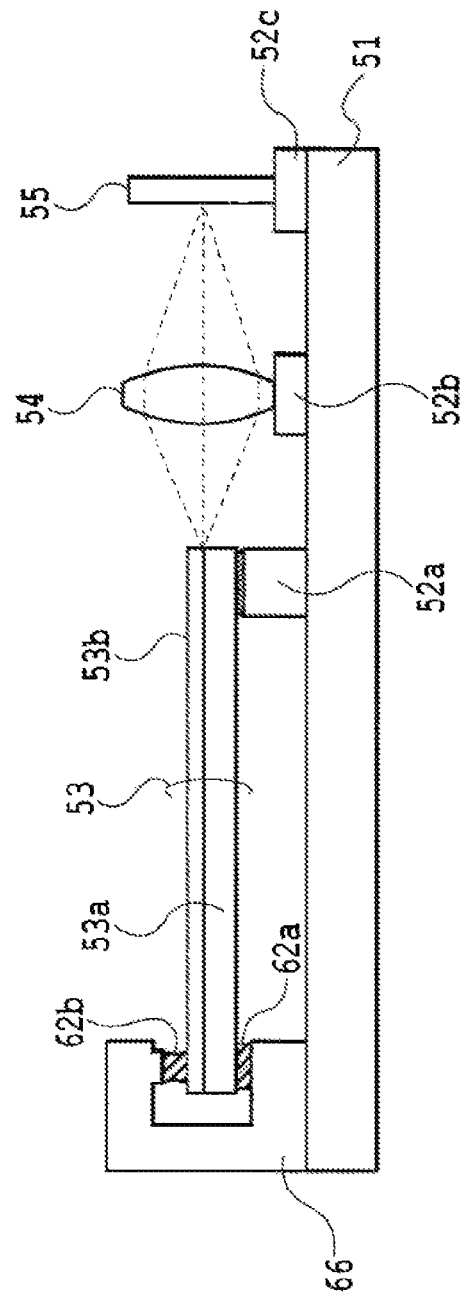
FIG. 9 is a diagram illustrating the internal structure of an optical module according to Embodiment 5 of the present invention.

FIG. 9 illustrates the internal structure of an optical module in accordance with Embodiment 5 of the present invention. A planar lightwave circuit 53 where an optical multiplexing/demultiplexing circuit is formed as an optical functional circuit, a lens 54 and an optical functional element 55 are respectively fixed to a base substrate 51 by fixing mounts 52a, 52b, and 52c that serve as supporting members. A connection to an optical fiber is not shown for simplifying the drawing. As well as in Embodiment 2, the waveguide region within the optical circuit prepared on the planar lightwave circuit 53 is only fixed to the fixing mount 52a by employing an adhesive 58. Meanwhile, an auxiliary mount 66 has a C-shape in a side view. The planar lightwave circuit 53 is fixed to the auxiliary mount 66 by using two portions, i.e., the face of an Si substrate 53a and the face of a silica glass layer 53b, and the area size for fixing the face flower face) of the Si substrate 53a is greater than the area size for fixing the face (upper face) of the silica glass layer 53b.

Since the planar lightwave circuit 33 has a layer structure using various different types of materials, there is a possibility that warp may be changed due to thermal changes. In a case wherein the temperature dependence of warp is satisfactorily low, the structure described in Embodiment 4 is appropriate. However, in a case wherein the temperature dependence of warp is high, the planar lightwave circuit 53 is restricted by the auxiliary mount, and therefore, new stress is generated due to thermal changes.

Therefore, in Embodiment 5, different bonding area sizes are employed for the upper face and the lower face, so that the layer thicknesses of the elastic adhesive 62a and 62b that have been displaced (shrunk and expanded, respectively) by the occurrence of the warp of the planar lightwave circuit 53 due to thermal change can match the layer thicknesses of the elastic adhesives 62a and 62b obtained when the forces exerted by the elastic adhesives are equaled.

Embodiment 6

FIGS. 10A to 10C illustrate the internal structure of an optical module in accordance with Embodiment 6 of the present invention. In Embodiments 1 to 5, the planar lightwave circuit 53 is horizontally mounted on the base substrate 51, while in Embodiment 6, a planar lightwave circuit is mounted perpendicularly to a base substrate 51. As well as Embodiments 1 to 5, a planar lightwave circuit 53, lens 54 and an optical functional element 55 are included as an optical functional circuit, and are fixed to the base substrate 51 by employing fixing mounts 52a, 52b and 52c. An optical fiber 56 is connected to the planar lightwave circuit 53 via an optical fiber fixing part 57. The optical fiber 56 is a tape-fiber array having a plurality of cores.

As well as in Embodiments 1 to 5, of the optical circuit of the planar lightwave circuit 53, only the waveguide region is fixed to the fixing mount 52a by employing an adhesive 58. Meanwhile, auxiliary mounts 67a and 62b have a C-shape in a side view in FIG. 10C, and the planar lightwave circuit 53 is fixed to the auxiliary mounts 67a and 67b by using two portions, i.e., the face of an Si substrate 53a and the face of a silica glass layer 53b.

In Embodiment 6, the planar lightwave circuit 53 is fixed to the auxiliary mount 67a by using an elastic adhesive 62 along the side opposite the side where the emission end face of the planar lightwave circuit 53 is formed, so that vibration of the planar lightwave circuit 53 can be reduced, and the force applied by the optical fiber fixing part 57 can be absorbed. Further, the planar lightwave circuit 53 is also fixed to the auxiliary mount 67b along the area between the side where the emission end face of the planar lightwave circuit 53 is formed and the opposed side, and therefore, when the planar lightwave circuit 53 vibrates, the portion having a great amplitude can be held down.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical module, comprising:
a planar lightwave circuit including a waveguide-type optical functional circuit formed on a substrate, the waveguide-type optical functional circuit having a waveguide region where only an optical waveguide is formed in contact with a side, wherein an end face of the optical waveguide is formed in contact with the side, the end face being an emission end face where output light is emitted from the optical functional circuit, or an entrance end face where input light is entered to the optical functional circuit;
a fixing mount employed to hold the planar lightwave circuit only in a portion where the waveguide region is located; and
an auxiliary mount employed to hold the planar lightwave circuit in contact with a side that is opposite the side in contact with the end face, wherein the planar lightwave circuit and the auxiliary mount are fixed together by employing an elastic adhesive or an elastic structure that has lower elasticity than that of an adhesive or a bonding material that rigidly fixes the planar lightwave circuit to the fixing mount.

2. The optical module according to claim 1, further comprising:
an intermediate auxiliary mount inserted between the planar lightwave circuit and the auxiliary mount,
wherein the planar lightwave circuit and the intermediate auxiliary mount are fixed together by employing an elastic adhesive or an elastic structure, and the intermediate auxiliary mount and the auxiliary mount are fixed together by employing an adhesive or a bonding material.

3. The optical module according to claim 1, wherein the planar lightwave circuit and the auxiliary mount are fixed by employing the elastic adhesive or the elastic structure at two portions of a face of the substrate of the planar lightwave circuit and a face of the optical functional circuit of the planar lightwave circuit.

4. The optical module according to claim 3, wherein:
an area size of the planar lightwave circuit for fixing the face of the substrate and an area size of the planar lightwave circuit for fixing the face of the optical functional circuit differ from each other; and
the area sizes for two portions are determined, so that layer thicknesses of elastic adhesives at the two portions obtained when the planar lightwave circuit has warped due to thermal change match the layer thicknesses at the two portions obtained when forces exerted by the elastic adhesives are equaled.

5. The optical module according to claim 1, further comprising a plurality of auxiliary mounts.

6. The optical module according to claim 1, wherein the layer thicknesses of the elastic adhesives are 100 μm to 1 mm.

7. An optical module comprising:
a planar lightwave circuit extending between a first end and an opposing second end, the planar lightwave circuit comprising:
a substrate having opposing top and bottom surfaces; and
a waveguide-type optical functional circuit formed on the top surface of the substrate, the waveguide-type optical functional circuit having an end face at the first end of the planar lightwave circuit for propagating light thereto or therefrom, the waveguide-type optical functional circuit comprising:
a first region positioned on a first portion of the substrate at the first end of the planar lightwave circuit, the first region comprising an optical waveguide abutting the end face; and
a second region spaced apart from the first region, the second region being positioned on a second portion of the substrate at the second end of the planar lightwave circuit;
a fixing mount on which the first region of the planar lightwave circuit is mounted, the fixing mount and the first region of the planar lightwave circuit being rigidly fixed together by a first adhesive or a first bonding material having a first elasticity; and
an auxiliary mount to which the second region of the planar lightwave circuit is rigidly fixed by an elastic adhesive or an elastic structure having a second elasticity that is lower than the first elasticity.

8. The optical module according to claim 7, further comprising:

an intermediate auxiliary mount inserted between the planar lightwave circuit and the auxiliary mount,
wherein the planar lightwave circuit and the intermediate auxiliary mount are fixed together by the elastic adhesive or the elastic structure, and the intermediate auxiliary mount and the auxiliary mount are fixed together by a second adhesive or a second bonding material.

9. The optical module according to claim 7, wherein the planar lightwave circuit is fixed to the auxiliary mount by the elastic adhesive or the elastic structure at multiple portions of the second region.

10. The optical module according to claim 7, wherein the second region of the planar lightwave circuit is fixed to the auxiliary mount by using the elastic adhesive or the elastic structure on both a top surface and a bottom surface of the planar lightwave surface.

11. The optical module according to claim 7, further comprising a plurality of auxiliary mounts on which the planar lightwave circuit is mounted.

12. The optical module according to claim 7, wherein the elastic adhesive has a layer thickness of 100 μm to 1 mm.

* * * * *